United States Patent [19]

Stackhouse

[11] Patent Number: 4,905,313
[45] Date of Patent: Feb. 27, 1990

[54] GAS/LIQUID CONTACT APPARATUS

[75] Inventor: David W. Stackhouse, Sebastopol, Calif.

[73] Assignee: Custodis-Ecodyne, Santa Rosa, Calif.

[21] Appl. No.: 324,920

[22] Filed: Mar. 17, 1989

[51] Int. Cl.⁴ ............................................. B01F 3/04
[52] U.S. Cl. ................................................ 261/112.2
[58] Field of Search ..................................... 261/112.2

[56] References Cited

U.S. PATENT DOCUMENTS

| | | | |
|---|---|---|---|
| 3,249,155 | 5/1966 | Huet | 261/112.2 |
| 3,775,234 | 11/1973 | Rich | 261/112.2 |
| 3,862,280 | 1/1975 | Polovina | 261/112.2 |
| 4,139,584 | 2/1979 | Holmberg | 261/112.2 |
| 4,512,938 | 4/1985 | Jones et al. | 261/112.2 |
| 4,548,766 | 10/1985 | Kinney, Jr. et al. | 261/112.2 |
| 4,670,197 | 6/1987 | Stackhouse | 261/112 |
| 4,732,713 | 3/1988 | Korsell | 261/112.2 |

Primary Examiner—Tim Miles
Attorney, Agent, or Firm—Dressler, Goldsmith, Shore, Sutker, & Milnamow, Ltd.

[57] ABSTRACT

A gas/liquid contact apparatus that includes a plurality of packing sheets arranged in parallel, vertical, upright, face-to-face relationship. The packing sheets have a series of inclined corrugations formed therein. Each of the corrugations is formed so as to define an alternating series of longitudinally extending, oppositely inclined surfaces that intersect and pass through a center plane of the packing sheet so as to define hills and valleys. The packing sheets are secured together at contact points, wherein the hills of one of the packing sheets contacts the valleys of an immediately adjacent packing sheet. The relative location and the distance between the adjacent hills and valleys in adjacent corrugations varies so as to cause the contact points to be dispersed over a relatively wide area of the surfaces of the packing sheets.

8 Claims, 4 Drawing Sheets

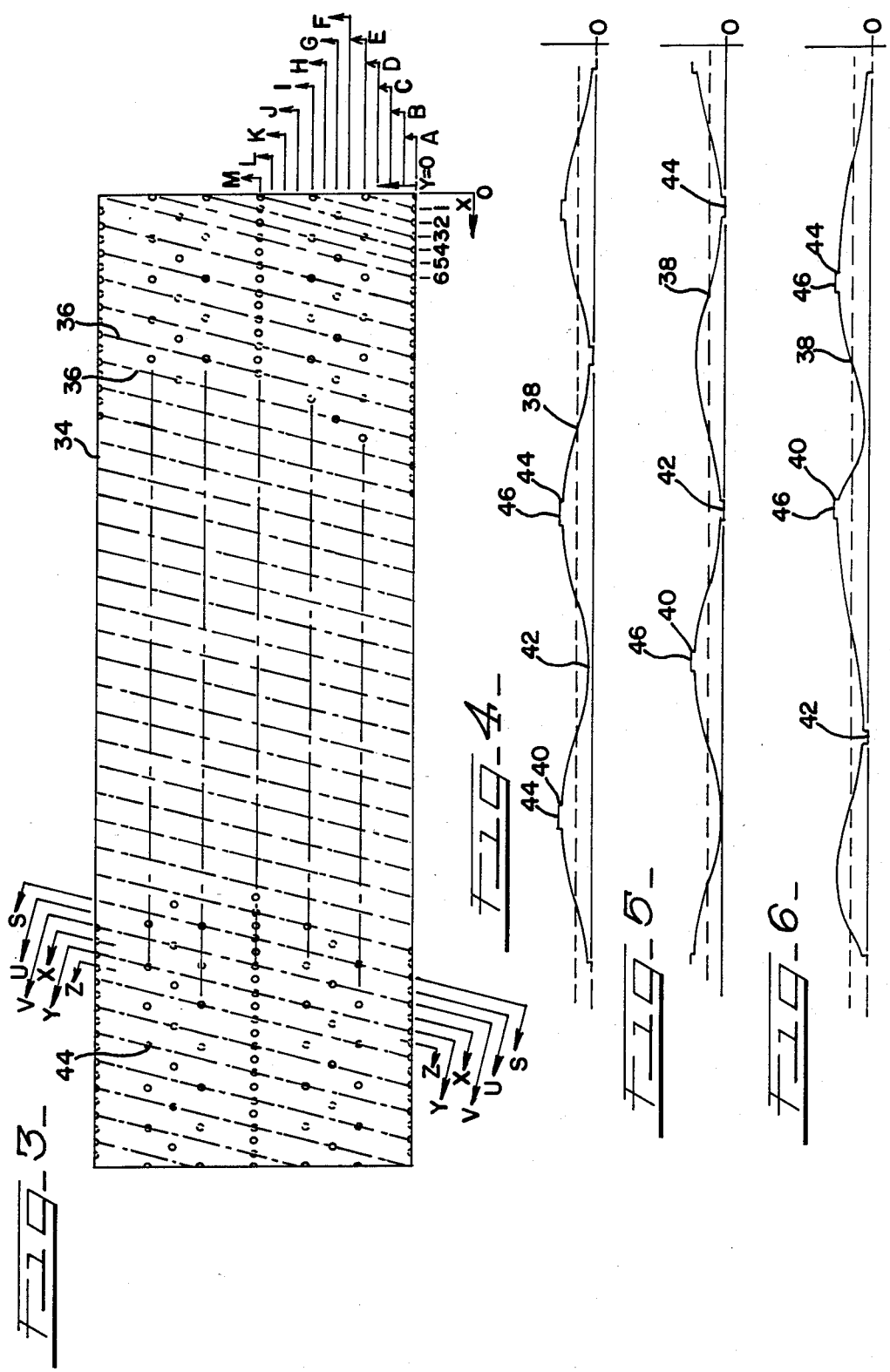

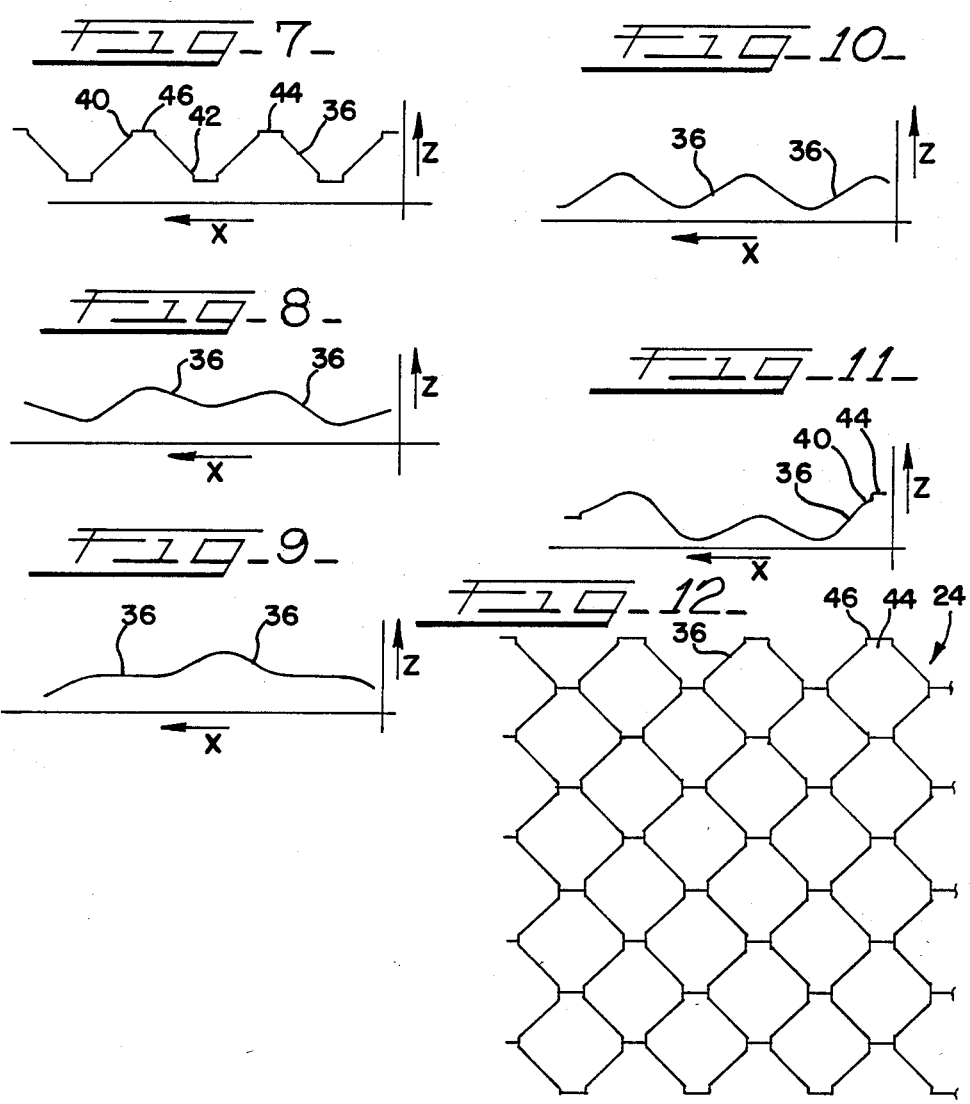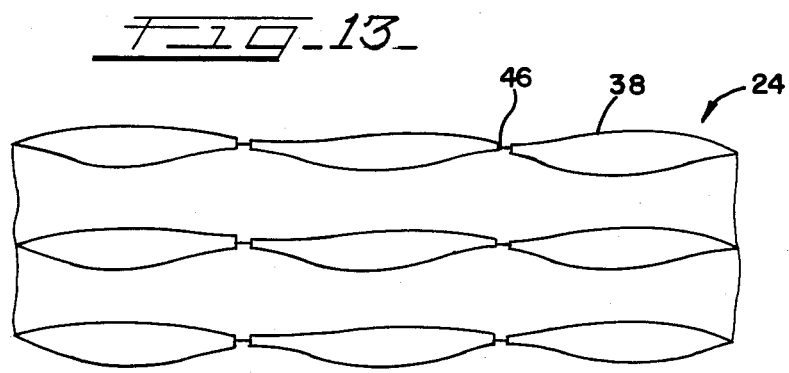

FIG. 14

DIMENSIONS ("Z") IN INCHES @ MEAN LINE OF MATERIAL

| SECT. \ X (IN.) | 0.00 | 0.25 | 0.50 | 0.75 | 1.00 | 1.25 | 1.50 | 1.75 | 2.00 | 2.25 | 2.50 | 2.75 | 3.00 | 3.25 | 3.50 | 3.75 | 4.00 | 4.25 | 4.50 | 4.75 | 5.00 | 5.25 | 5.50 | 5.75 | 6.00 |
|---|---|---|---|---|---|---|---|---|---|---|---|---|---|---|---|---|---|---|---|---|---|---|---|---|---|
| A | *.750 | .640 | .375 | .111 | *.000 | .111 | .375 | .640 | *.750 | .640 | .375 | .111 | *.000 | .111 | .375 | .640 | *.750 | .640 | .375 | .111 | *.000 | .111 | .375 | .640 | *.750 |
| B | .933 | .243 | .150 | .111 | .188 | .375 | .562 | .640 | *.750 | .640 | .507 | .375 | .188 | .111 | .375 | .375 | .375 | .375 | .188 | .111 | .150 | .243 | .336 | .640 | *.750 |
| C | .187 | .310 | .375 | .375 | .375 | .375 | .375 | .430 | .562 | .695 | .750 | .695 | .562 | .430 | .375 | .375 | .375 | .375 | .375 | .320 | .187 | .055 | .000 | .055 | .187 |
| D | .562 | .640 | .462 | .375 | .189 | .111 | .188 | .375 | .562 | .640 | .562 | .375 | .188 | .111 | .188 | .375 | .562 | .640 | .562 | .375 | .189 | .111 | .188 | .375 | .562 |
| E | *.750 | .640 | .375 | .111 | *.000 | .055 | .187 | .320 | .375 | .320 | .187 | .055 | *.000 | .111 | .375 | .640 | .750 | .640 | .375 | .430 | .562 | .640 | .640 | .640 | *.750 |
| F | .562 | .375 | .188 | .111 | .111 | .111 | .111 | .111 | .111 | .111 | .111 | .111 | .111 | .111 | .375 | .562 | .640 | .562 | .430 | .562 | .640 | .640 | .640 | .640 | .562 |
| G | .375 | .375 | .375 | .320 | .187 | .055 | *.000 | .035 | .187 | .320 | .375 | .375 | .375 | .375 | .375 | .430 | .562 | .695 | .750 | .695 | .562 | .430 | .375 | .375 | .375 |
| H | .562 | .640 | .553 | .345 | .137 | .050 | .137 | .345 | .553 | .640 | .562 | .375 | .188 | .111 | .188 | .375 | .562 | .613 | .700 | .613 | .562 | .430 | .375 | .188 | .562 |
| I | .750 | .667 | .468 | .269 | .187 | .269 | .468 | .667 | .750 | .640 | .375 | .111 | *.000 | .197 | .405 | .613 | .480 | .281 | .480 | .613 | .405 | .197 | .111 | .375 | *.750 |
| J | .601 | .507 | .413 | .375 | .507 | .601 | .640 | .562 | .375 | .189 | .111 | .150 | .243 | .336 | .375 | .281 | .150 | .000 | .082 | .111 | .188 | .375 | .562 | .640 | .601 |
| K | .468 | .534 | .562 | .458 | .402 | .375 | .375 | .375 | .375 | .375 | .347 | .215 | .291 | .347 | .375 | .375 | .375 | .375 | .375 | .375 | .375 | .375 | .375 | .402 | .468 |
| L | .613 | .700 | .613 | .405 | .197 | .111 | .189 | .375 | .512 | .640 | .539 | .345 | .101 | .050 | .197 | .345 | .539 | .640 | .575 | .375 | .189 | .111 | .197 | .405 | .613 |
| M | *.750 | .640 | .375 | .111 | *.000 | .111 | .375 | .640 | *.750 | .640 | .375 | .111 | *.000 | .111 | .375 | .640 | *.750 | .640 | .375 | .111 | *.000 | .111 | .375 | .640 | *.750 |

FIG. 15

DIMENSIONS ("Z") IN INCHES @ MEAN LINE OF MAT'L.

| SECT. \ Y (IN.) | 0.0 | 1.0 | 2.0 | 3.0 | 4.0 | 5.0 | 6.0 | 7.0 | 8.0 | 9.0 | 10.0 | 11.0 | 12.0 | 13.0 | 14.0 | 15.0 | 16.0 | 17.0 | 18.0 | 19.0 | 20.0 | 21.0 | 22.0 | 23.0 | 24.0 |
|---|---|---|---|---|---|---|---|---|---|---|---|---|---|---|---|---|---|---|---|---|---|---|---|---|---|
| Z-Z | *.000 | .375 | .750 | .640 | .375 | .111 | *.000 | .050 | .187 | .375 | .562 | .700 | .750 | .700 | .562 | .375 | .187 | .050 | *.000 | .111 | .375 | .562 | .750 | *1.000 | .750 |
| Y-Y | *.750 | .640 | .375 | .111 | *.000 | .111 | .375 | .640 | *.750 | .640 | .375 | .111 | *.000 | .111 | .375 | .640 | *.750 | .640 | .375 | .111 | *.000 | .111 | .375 | *.750 | .750 |
| X-X | *.000 | .111 | .375 | .640 | .750 | .640 | .375 | .111 | *.000 | .111 | .375 | .640 | .750 | .640 | .375 | .111 | *.000 | .111 | .375 | .640 | .750 | .640 | .375 | .111 | *.000 |
| V-V | *.750 | .375 | .000 | .375 | .750 | .375 | .750 | .700 | .562 | .750 | .375 | .060 | .375 | .750 | .375 | *.000 | .375 | *.750 | *.050 | .050 | .187 | .375 | .562 | .700 | .750 |
| U-U | *.000 | .111 | .375 | .640 | .750 | .640 | .375 | .111 | *.000 | .111 | .375 | .640 | .750 | .640 | .375 | .111 | *.000 | .111 | .375 | .640 | .750 | .640 | .375 | .111 | *.000 |
| S-S | *.750 | .640 | .375 | .111 | *.000 | .111 | .375 | .640 | *.750 | .640 | .375 | .111 | *.000 | .111 | .375 | .640 | *.750 | .640 | .375 | .111 | *.000 | .111 | .375 | *1.000 | .750 |

GAS/LIQUID CONTACT APPARATUS

FIELD OF THE INVENTION

The present invention relates generally to an improved gas/liquid contact apparatus and, more specifically, to a gas/liquid contact apparatus for use as a film-type fill packing in cooling towers.

BACKGROUND OF THE INVENTION

In providing a heat exchange surface for a cooling tower or the like, a variety of different types of contact body elements have been utilized in forming cooling tower fill sections to bring water into intimate contact with air in a cooling tower. The water to be cooled is typically sprayed onto the contact body elements where it forms a thin film. Air is drawn between the space between the contact body elements and into contact with the water film which is thereby cooled.

One such type of contact body element arrangement includes a film-type fill packing comprising a plurality of corrugated packing sheets disposed in a vertical, parallel relationship such that the corrugations form channels in which water to be cooled is brought into contact with cooling air. The corrugations of adjacent sheets are typically arranged at opposite angles to provide mechanical strength and enhance the distribution of water and air within the fill packing. Examples of such prior art fill packings are disclosed in U.S. Pat. Nos. 3,862,280; 4,139,584; and 4,512,938.

An improved fill packing design is disclosed in U.S. Pat. No. 4,670,197, which patent is assigned to the same assignee as the present invention. A gas/liquid contact apparatus is disclosed that includes a plurality of packing sheets arranged in a parallel, face-to-face relationship. The packing sheets have a series of corrugations formed therein that generally extends at an angle in the range of 10 to 45 degrees from a vertical direction. Each of the corrugations is formed so as to define an alternating series of longitudinally extending, oppositely inclined surfaces that intersect and pass through a center plane of the packing sheet so as to define hills and valleys on opposite sides of the center plane. The inclined surfaces have an amplitude relative to the center plane of the packing sheet that is opposite that of the adjacent inclined surfaces of an adjacent corrugation. The packing sheets are arranged adjacent each other such that the corrugations of adjacent packing sheets are oppositely oriented.

The adjacent packing sheets are secured together at the contact points wherein the hills of one of the packing sheets contacts the valleys of an immediately adjacent packing sheet. Each of the corrugations has a plurality of equally spaced-apart hills and valleys having a contact point associated therewith, such that each of the corrugations has a contact point located in one of a plurality of spaced-apart horizontal planes. In so doing, numerous horizontal rows of concentrated contact points are present that tend to restrict airflow and results in increased pressure drop through the pack.

The present invention is specifically directed to an improvement to the gas/liquid contact apparatus disclosed in U.S. Pat. No. 4,670,197. The improvement is accomplished by changing the shape of the inclined surfaces so that certain of the hills and valleys occur at different locations in adjacent corrugations. In so doing, the contact points are dispersed over a wider area of the surfaces, reducing restrictions to airflow and increasing the resistance of the pack to buckling under compressive loads.

SUMMARY OF THE INVENTION

According to the present invention, a gas/liquid contact apparatus is provided that includes a plurality of packing sheets arranged in a parallel, vertical, upright, face-to-face relationship. Each of the packing sheets has a series of generally parallel corrugations formed therein that generally extends at an angle in the range of 10 to 45 degrees from a vertical direction. The corrugations are formed so as to define an alternating series of longitudinally extending, oppositely inclined surfaces that intersect and pass through a center plane of the packing sheet so as to define hills and valleys on opposite sides of the center plane. The amplitude of the inclined surfaces relative to the center plane at the hills is equal to and opposite the amplitude of the inclined surfaces at the valleys. The packing sheets are arranged such that the corrugations of adjacent packing sheets are oppositely oriented and the sheets are secured together at contact points wherein the hills of one of the packing sheets contacts the valleys of an immediately adjacent packing sheet.

The relative location and the distance between the adjacent hills and valleys in adjacent corrugations varies so as to cause the contact points to be dispersed over a relatively wide area of the surfaces of the packing sheets. More specifically, a contact point is located along each of the corrugations in certain spaced-apart horizontal planes and at least one contact point is located along each of the corrugations between the contact points in such certain horizontal planes. The contact points located between the contact points in the horizontal planes of immediately adjacent corrugations are located in different horizontal planes. The dispersion of the contact points provides additional locations for the sheets to brace each other and thereby increase the resistance of the pack to buckling under compressive loads to reduce the restriction to airflow and the pressure drop.

BRIEF DESCRIPTION OF THE DRAWINGS

The invention is described in greater detail in the following description of a preferred embodiment thereof, with reference to the accompanying drawings, in which:

FIG. 3 is an elevational front schematic view of the gas/liquid contact apparatus of the present invention, with the solid circles depicting boss locations at a hill and phantom circles depicting boss locations at a valley;

FIG. 4 is a sectional view taken along line X—X in FIG. 3 through a corrugation of a packing sheet constructed in accordance with a preferred embodiment thereof;

FIG. 5 is a sectional view similar to FIG. 4 taken along line Y—Y in FIG. 3;

FIG. 6 is a sectional view similar to FIG. 4 taken along line Z—Z in FIG. 3;

FIG. 7 is a horizontal sectional view taken along line A—A in FIG. 3 through a section of a packing sheet adjacent an edge thereof;

FIG. 8 is a horizontal sectional view similar to FIG. 7 taken along line B—B in FIG. 3;

FIG. 9 is a horizontal sectional view similar to FIG. 7 taken along line C—C in FIG. 3;

FIG. 10 is a horizontal sectional view similar to FIG. 7 taken along line D—D in FIG. 3;

FIG. 11 is a horizontal sectional view similar to FIG. 7 taken along line E—E in FIG. 3;

FIG. 12 is an elevational view taken in the direction of line 12—12 in FIG. 2 of the gas/liquid contact apparatus of the present invention;

FIG. 13 is an elevational view taken in the direction of line 13—13 in FIG. 2 of the gas/liquid contact apparatus of the present invention;

FIG. 14 is a table setting forth the depth dimensions ("Z") in inches at the mean line of the packing sheet relative to the width dimensions ("X") in inches from a side edge of the packing sheet along the section lines A—A through M—M in FIG. 3; and FIG. 15 is a table setting forth the depth dimensions ("Z") in inches at the mean line of the packing sheet relative to the height dimensions ("Y") in inches from a bottom edge of the packing sheet along the section lines S—S, U—U, V—V, X—X, Y—Y and Z—Z in FIG. 3.

DESCRIPTION OF PREFERRED EMBODIMENTS

Figure 1:
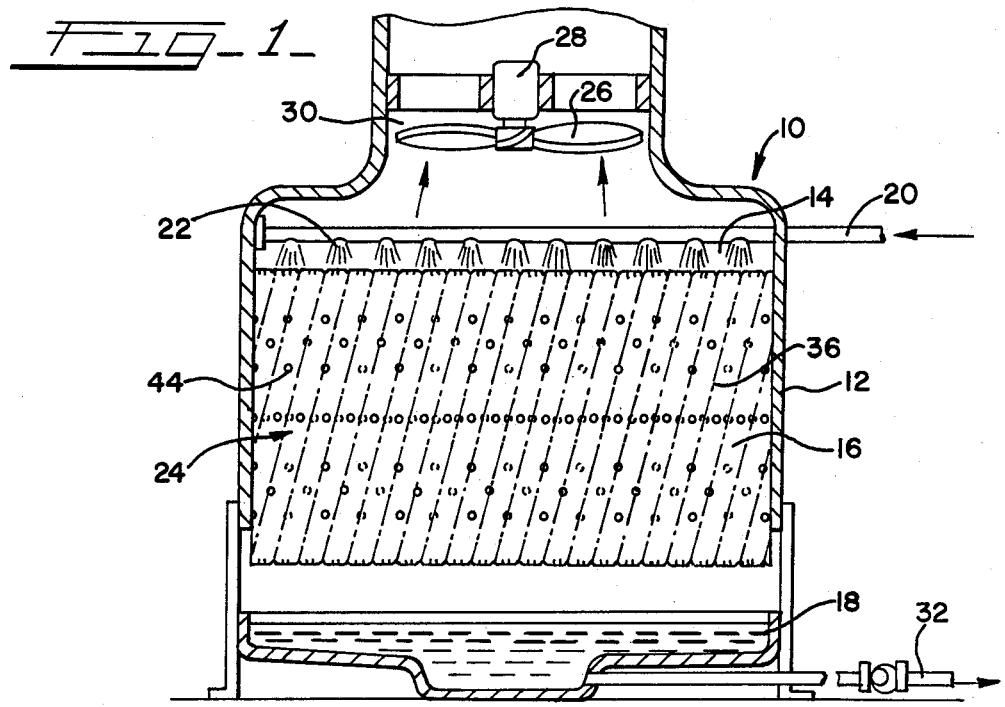
FIG. 1 is a vertical longitudinal cross-sectional schematic view through a representative counterflow cooling tower utilizing the gas/liquid contact apparatus of the present invention.

Referring to FIG. 1, a representative counterflow cooling tower is indicated by the reference numeral 10. Cooling tower 10 includes a housing 12 defining a water distribution zone 14, a gas/liquid contact zone 16 and a water collection zone 18. A liquid, such as water, is directed through a supply line 20 into distribution zone 14 through suitable spray nozzles 22. The gas/liquid contact apparatus 24 is supported within zone 16 directly below distribution zone 14. The water contacts the surfaces of the gas/liquid contact apparatus 24 as it descends through zone 16 and is collected in collection zone 18. A gas, such as air, is directed through gas/liquid contact zone 16 in countercurrent relationship to the descending water, as indicated by the arrows in FIG. 1. Air may be drawn into gas/liquid contact zone 16 in an upward direction by a fan 26, driven by a motor 28, both mounted in a gas outlet zone 30 above distribution zone 14. Alternatively, the fan may be eliminated in a natural draft arrangement, as is well-known in the art. The water and air are in contact within gas/liquid contact zone 16 in a heat exchange relationship. The water collected in collection zone 18 is directed from tower 10 through an outlet line 32.

Although not specifically shown in the drawings, the gas/liquid contact apparatus of the present invention may also be utilized in a cross-flow cooling tower. As is well-known in the art, in such cooling towers, the air is directed substantially horizontally across the gas/liquid contact apparatus in contact with the water descending therethrough.

In order to maximize the thermal efficiency of a cooling tower, it is desirable to maximize the surface contact of the descending water and the air and promote a thorough mixing thereof, while minimizing the resistance to the flow of air through the cooling tower. The gas/liquid apparatus 24 constructed in accordance with the present invention is specifically designed to optimize the heat transfer efficiency between the water and the air and reduce the resistance to air flowing therethrough.

Figure 2:
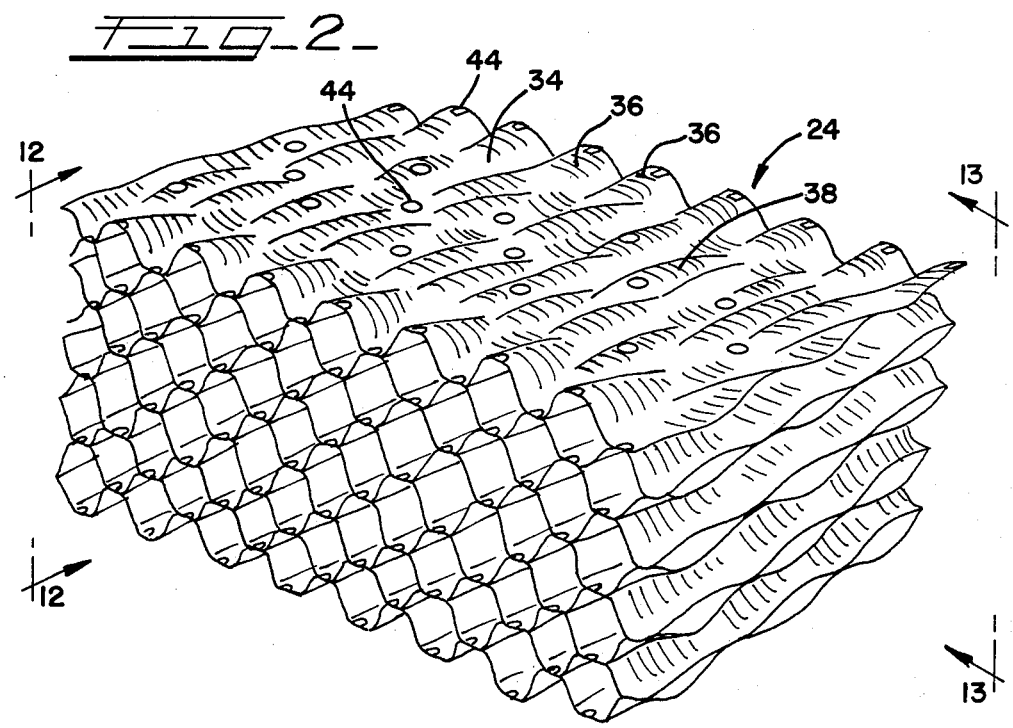
FIG. 2 is a perspective view of a portion of a preferred embodiment of the gas/liquid contact apparatus of the present invention.

Referring to FIGS. 2 and 3, a preferred embodiment of the gas/liquid contact apparatus or film-type fill packing 24 will now be described. Fill packing 24 has a plurality of packing sheets 34 generally arranged in a parallel, vertical, upright, face-to-face relationship. The packing sheets are formed with a series of parallel corrugations 36 that generally extends at an angle in the range of 10 to 45 degrees, and preferably about 15 degrees, from a vertical direction. The corrugations 36 have a generally sinusoidal profile in horizontal cross section, as best seen in FIGS. 7-11.

Referring to FIGS. 4-6, each of the corrugations 36 is formed so as to define an alternating series of longitudinally extending, oppositely inclined surfaces 38 that intersect and pass through a center plane of the packing sheet 34 (as indicated by a phantom line in FIGS. 4-6) so as to define hills 40 and valleys 42 on opposite sides of the center plane. The inclined surfaces 38 in accordance with a preferred embodiment of the invention are generally a sinusoidal curve.

In accordance with a unique feature of the invention, the relative location and the distance between the adjacent hills 40 and valleys 42 in adjacent corrugations 36 vary. Referring to FIGS. 4-6 and the table set forth in FIG. 15, the corrugations 36 are formed in a repeating series of six different configurations spacing the hills and valleys at different locations. The table expressed in FIG. 15 sets forth the "Z" dimension in inches at the mean line of the packing sheet (as indicated in FIGS. 4-6 and 7-11) and the "Y" dimension in inches (as indicated in FIG. 3) along each of the six different corrugation configurations identified at sections S—S, U—U, V—V, X—X, Y—Y and Z—Z in FIG. 3 and in the table and respectively shown through sections X—X, Y—Y and Z—Z in FIGS. 4-6.

Referring to FIGS. 7-11 and the table set forth in FIG. 14, the horizontal cross-sectional shape taken through the series of six adjacent corrugations 36 at various vertical locations is represented and shown. The table expressed in FIG. 14 sets forth the "Z" dimension in inches at the mean line of the packing sheet (as indicated in FIGS. 7-11) and the "X" dimension in inches (as indicated in FIGS. 3 and 7-11) through the sections A—A through M—M shown in FIG. 3. FIGS. 7-11 respectively show the repeating pattern taken through the sections A—A through E—E in FIG. 3.

Certain of the hills 40 and valleys 42 defined in the corrugations 36 are preferably formed with bosses 44 defining substantially flat surfaces or contact points 46 parallel to the center plane of the sheet 34. The location of the bosses 44 along the corrugations 36 is represented by a small circle in FIG. 3 and denoted by an asterisk in FIGS. 14 and 15.

Referring to FIG. 3, each of the corrugations 36 has a boss 44 defining a contact point 46 located in a horizontal plane taken through the bottom, top and center of the sheet 34. Each of said corrugations 36 further has an additional boss 44 defining a contact point 46 located between the contact points located in such bottom, top and center horizontal planes. These bosses 44 and contact points 46 are located in one of a plurality of substantially equally spaced, horizontal planes such that the boss 44 and contact point 46 of immediately adjacent corrugations are located in different horizontal planes.

The packing sheets 34 are assembled such that the sheets are arranged adjacent each other so that the corrugations 36 of adjacent sheets are oppositely oriented. The adjacent packing sheets 34 are secured together at the contact points defined by the flat surfaces or contact points 46 of the bosses 44, preferably by application of a suitable glue thereto. In so doing, the contact points are dispersed over a plurality of horizontally spaced planes, increasing the resistance of the packing 24 to buckling under compressive loads. The dispersion of these contact points also serves to reduce the restriction to airflow and the pressure drop through the packing 24.

The packing sheets are preferably thermoformed from a suitable plastic material such as PVC or the like.

In use in a cooling tower, the gas/liquid contact apparatus or film-type fill packing 24, as described hereinabove, defines a convoluted path for water to descend and promotes a thorough mixing of the water and air, which yields a high level of heat transfer efficiency. The specific spacial relationships between the corrugations 36 and the inclined surfaces 38 provide a large open area between adjacent packing sheets 34. The dispersion of the contact points 46 reduces the restriction to airflow and reduces the pressure drop, while increasing the resistance of the packing 24 to buckling under compressive loads.

While the foregoing describes a preferred embodiment of the present invention, other modifications and/or equivalents may be employed without departing from the scope of the invention, which is defined in the appended claims.

What is claimed is:

1. Apparatus for gas/liquid contact, comprising:
   (a) a plurality of packing sheets arranged in a generally parallel, vertical, upright, face-to-face relationship;
   (b) each of said packing sheets having a series of generally parallel corrugations formed therein that generally extend at an angle in the range of about 10 to 45 degrees from a vertical direction;
   (c) each of said corrugations being formed so as to define an alternating series of longitudinally extending, oppositely inclined surfaces that intersect and pass through a center plane of the packing sheet so as to define hills and valleys on opposite sides of the center plane;
   (d) wherein the amplitude relative to the center plane of said inclined surfaces at said hills is substantially equal to and opposite the amplitude of said inclined surfaces at said valleys;
   (e) wherein the relative location and the distance between the adjacent hills and valleys in adjacent corrugations varies; and
   (f) said packing sheets being arranged adjacent to each other such that the corrugations of adjacent packing sheets are oppositely oriented.

2. The invention as defined in claim 1 wherein said inclined surfaces are curved so as to generally define a sinusoidal curve.

3. The invention as defined in claim 1 wherein said adjacent packing sheets are secured together at contact points, wherein the hills of one of said packing sheets contact the valleys of an immediately adjacent packing sheet over a relatively wide area of the surfaces thereof so as to reduce restriction to airflow directed therebetween.

4. The invention as defined in claim 3 wherein said packing sheets are formed with bosses defining substantially flat surfaces at said contact points.

5. The invention as defined in claim 4 wherein said adjacent packing sheets are glued together at said contact points.

6. The invention as defined in claim 3 wherein a contact point is located along each of said corrugations in spaced-apart, horizontal planes and at least one contact point is located along each of said corrugations between the contact points in said horizontal planes.

7. The invention as defined in claim 6 wherein the contact points located between the contact points in said horizontal planes of immediately adjacent corrugations are located in different horizontal planes.

8. The invention as defined in claim 7 wherein the contact points located between the contact points in said horizontal planes are located in one of a plurality of substantially equally spaced, horizontal planes.

* * * * *